3,586,511
Patented June 22, 1971

3,586,511
METHOD OF MAKING SACCHARIFEROUS ANIMAL FEED AND THE RESULTING PRODUCT
Ralph W. Bishop, 312 N. Atlantic St., Clewiston, Fla. 33440
No Drawing. Filed July 1, 1966, Ser. No. 562,073
Int. Cl. A23k 1/14
U.S. Cl. 99—2                                  8 Claims

ABSTRACT OF THE DISCLOSURE

A method of producing a pelletized racchariferous animal feed from sugar cane by controlled burning standing sugar cane in the field to burn off the dead relatively dry leaves and simultaneously decrease the moisture content of the remaining stalk without effecting significant charring thereof, followed by harvesting and comminution of the cane after which it is dried to a low moisture content and pelletized.

---

This invention relates to a new and improved method of making a sacchariferous animal feed. More particularly, this invention relates to a method of utilizing sugar cane plant tops, stalks and the like to provide animal feed characterized by a nutritionally significant proportion of sugar. Furthermore, the present invention relates to a method of making sacchariferous animal feed of a generally non-tacky fluent nature which may be stored for extended periods of time without any significant biochemical degradation.

In recent years, there has been a considerable amount of research into the utilization of sugar in animal feeds. It is presently known that a number of benefits can be derived from feeding animals, such as beef cattle for example, a diet which includes a nutritionally significant proportion of a sacchariferous substance. In this regard it has been shown that sugar can be used to supply most of the carbohydrate required in some rations. But, it is also appreciated that the utilization of sugar in animal feed poses a number of problems such as is attendant to the handling of sugar due to its tendency to set-up as well as the fact that certain nutrients normally present in other feedstuffs such as corn, for example, are not generally present in sugar.

However, it is recognized that there are a number of values to be derived from sugar in addition to replacing the energy producing constituents derived from grain. Such values include increasing palatability and some evidence that sugar can reduce ketosis. Also research at some agricultural stations in sugar producing states has shown that feeding of sugar can reduce weight loss of livestock in shipment. There is research evidence, too, of carcass improvement values in swine and beef cattle including increasing dressing percent, production of heavier livers, reduced incidence of dark cutting beef and improved pork flavor. However, as indicated heretofore it is appreciated that the utilization of sugar in animal feedstuffs is complicated by the difficulties normally encountered in utilizing sacchariferous substances such as relatively raw sugar, molasses, etc.

In recent years, and particularly since certain sources of sugar cane in the western hemisphere are for all practical purposes no longer available, there has been increasing activity in the growing of sugar cane in the United States to offset the loss of such sources of sugar cane. At the same time, it is generally recognized that an anomaly exists in the sugar cane producing regions of this country due to the fact that they are presently engaged in an attempt to establish themselves as major beef and dairy cattle raising regions despite the fact that a climate generally suited for the production of sugar cane, for example, is not particularly suited for the production of feedstuffs such as cereal feed grains. Furthermore, a number of problems have been experienced heretofore in this country in the growing of sugar cane not the least of which is the fact that the present day economics of farm labor are such that in this country sugar cane must of necessity generally be harvested by mechanical means. Unfortunately, the great amount of trash, i.e. such as dried leaves, etc. present on cane plants ready for harvesting, as well as the relatively non-sugar bearing plant tops, compound the difficulty associated with such mechanical harvesting. In addition, it will be appreciated that the aforementioned portions of the sugar cane plant not normally treated for the extraction of sugar have been heretofore considered to be of very little value and oftentimes left in the field to decay and subsequently turned under when plowing the field. However, there are a number of problems attendant the disposal of the generally "waste" portions of the cane plant in this manner inasmuch as the debris tends to compound the difficulties normally experienced with regard to insect and disease infestations normally associated with the raising of sugar cane in this country.

Earlier attempts to provide a solution of some of the aforementioned problems have suggested the utilization of sugar cane tops, i.e., the relatively immature top leaf portion which is normally devoid of any significant proportion of sacchariferous substances, in animal feeds so as to utilize such "waste" material. However, such utilization of sugar cane tops for the production of animal feed has heretofore required the addition of sacchariferous substances such as molasses, refined, or relatively crude sugar. While such a proposal might superficially appear to be a solution to some of the problems mentioned, upon further examination it will be appreciated that animal feedstuffs of this nature are characterized by an inordinately high crude fiber content as well as a deficiency of minerals and proteinaceous constituents necessary for the proper maintenance and growth of animals.

Accordingly, a definite need still exists for a method of making sacchariferous animal feed, and particularly feed of this general nature which comprises a significant proportion of plant matter derived from sugar cane plants so as to facilitate the harvesting of sugar cane and provide a satisfactory animal feed.

It is therefore a primary object of the present invention to provide a new and novel method of making sacchariferous animal feed.

It is another object of the present invention to provide a new and novel method for the making of animal feed from sugar cane plant stalks and tops.

A further object of the present invention is to provide a new and novel method of making sacchariferous animal feed from sugar cane plant stalks and tops whereby the cane standing in the field is treated in such a manner so to significantly reduce the amount of nutritionally undesirable crude fiber, and the like present thereon, and simultaneously effectively seal in and thus retain nutritionally desirable components of the sugar cane plant and particularly those present in the top which is normally relatively low in sugar content but nevertheless characterized by a nutritionally significant proportion of proteinaceous and mineral substances.

Still another object of the present invention is to provide a method of making sacchariferous animal feed from sugar cane plant stalks and tops wherein the standing cane is subjected to a controlled burning procedure to permit the use of natural heat to burn off the dry leaves present on the sugar cane stalk and sear but not char the upper green leaves on the immature top or end so as to seal in the nutritive components present in the top. This is followed by the harvesting of the sugar cane plant tops, together with a predetermined portion of the sugar bearing stalk plant, so as to provide after comminuting and artificial drying a generally fluent sacchariferous animal feed suitable as a balanced feed, or alternatively a base or carrier for the addition of various other nutritive components such as proteins, minerals, growth regulating substances, medicaments, etc.

Still another object of the preesnt invention is to provide an animal feed produced in the aforementioned manner in a suitable physical form such as a meal, pellet, bale, etc., which feed is of such a nature so as to permit storage of the feed for prolonged periods without any significant deterioration of the feed through the agencies of bacterial or chemical degradation.

Still a further object of the present invention is to provide a method of making sacchariferous animal feed from sugar cane plant tops and stalks by controlled burning, i.e., back-firing of standing cane to burn off the dry leaves, as well as reduce the moisture content of the tops and seal in desirable components contained within the sugar cane top, which burning operation in addition to facilitating the production of a sacchariferous feed also assists in preparing the sugar cane for the mechanical harvesting thereof by removing a large amount of the waste. Subsequently, the sugar cane plant is checked to determine the approximate length of sugar rich stalk to be removed with the relatively sugar free top so as to arrive at a feed product having a predetermined approximate sugar content. The appropriate length of the stalk and top and the complete top is removed and either immediately comminuted, such as by field harvester or windrowed to partially dry and then simultaneously loaded and comminuted by a field harvester preparatory to artificial drying which preferably is accomplished in a flowing gaseous media at a relatively high temperature so as to effect rapid drying without significant decomposition of the nutritionally desirable components. The dried feed may then be partially rehydrated to facilitate agglomeration and pelletization or merely utilized as a meal either with or without further comminution.

Further objects and advantages of the method of the present invention will become apparent from the following discussion.

Briefly, the present invention contemplates overcoming the disadvantages associated heretofore with the production and utilization of sacchariferous animal feed and particularly such feed including a significant proportion of vegetable matter derived from sugar cane by providing a method which comprises "burning" standing sugar cane in the cane field to remove dead relatively dry leaves and simultaeosuly decrease the moisture content, up to approximately six percent, in the relatively immature upper end or top of the cane stalk. The burning is done slowly, that is to say by back-firing wherein the cane field is fired from the down-wind side whereby the wind is utilized to control the rate of burning such as when back-firing to control a forest fire, for example, to permit the use of the heat developed by the burning of the dead leaves present on the ground and cane plant to dry the green leaves taking care of course not to significantly char the upper green leaves on the immature end of the stalk. Hereinafter this slow burning will be referred to as controlled burning and as will become readily apparent hereinafter as a discussion of the method of this invention proceeds such controlled burning does not destroy the nutritive value of the cane top but actually enhances it. Furthermore, it will be appreciated that the controlled burning substantially eliminates trash present in the cane field thus not only assisting in the production of nutritionally valuable animal feed but also clearing the field to facilitate mechanical harvesting of the cane.

As indicated heretofore the heating of the sugar cane plant tops by controlled burning removes a portion of the moisture present therein without significantly reducing the nutritive value thereof, providing that there is no significant charring of the tops, thus sealing in proteinaceous and other nutritive components by searing the outer surface of the top portion. The proteinaceous content of the feed produced can be varied somewhat through selection of cane varieties, degree of maturity, etc. due to varietal differences and the fact that high sugar laden cane plants have an appropriately higher protein content.

In order to determine the amount of relatively sugar-rich cane stalk to be removed with the top portion of the cane plant required to produce a finished feed the sugar content of the upper portion of the cane stalk is determined quantitatively such as by utilization of a refraction technique, for example, wherein a minute sample of the sap or sugar-bearing solution in the cane is placed in a refractometer in the path of a light ray whereby the refraction of the light ray as it passes through the sugar solution is measured to determine the sugar content of the sample, which content is normally expressed in Brix degrees. With this information it is then a relatively simple matter to mathematically determine the appropriate length of sugar-rich stalk to be removed with the cane tops in order to arrive at a final dehydrated feed product containing a predetermined percentage of sugar. Hereinafter it will be understood that when referring to Brix degrees it is meant that this is indicative of the sugar content of a solution. On the other hand when speaking of sugar percentage in the final product the sugar is not generally in solution and thus does not lend itself to a determination as expressed in Brix degrees inasmuch as an attempt to solubilize the sugar to obtain a reading in Brix degrees would undoubtedly lead to test error by virtue of the degradation of some of the sugar thus giving erroneous test results.

The upper portion of the sugar can plant, preferably although not necessarily including a portion of the sugar-rich can plant stalk corresponding in length to that determined as set forth hereinabove, is harvested. This portion of the cane ma ybe harvested in any suitable manner although it will be understood that as indicated heretofore from a practical standpoint the cost of labor normally precludes hand harvesting and thus necessitates the utilization of mechanized harvesting. Regardless of the mode of servering the desired portion of the cane plant, which it will be understood of course has been treated as indicated heretofore by controlled burning, it may then be immediately comminuted to facilitate artificial drying or alternatively be windrowed in the field without being comminuted whereby it is subjected to natural drying for a period of time so as to further reduce the moisture content thereof. It has been found that when utilizing field drying in this manner the can must not be permitted to dry for a period of time of more than approximately three days inasmuch as drying for a longer period of time in the field will not normally permit production of a satisfactory feed primarily due to biochemical degradation of the severed portion which of course results in the production of a feedstuff having an inordinately high crude fiber content and a deficiency of desirable nutritive components.

Preferably, the appropriate portion of cane plant is removed with a harvesting apparatus such as a forge harvester, for example, wherein the desired portion of the plant is simultaneously severed and comminuted by a conventional centrifugal blower-type chopper whereby the cane is reduced to a particle size ranging from approximately fines to approximately ¼". The comminuted cane plants are simultaneously blown into a suitable transporting vehicle, such as that of the type provided with a mechanical unloading means, for example, after which the comminuted cane is transported to a suitable gaseous current dehydrator conventionally utilized for the dehydration of forage crops. A suitable dryer of this nature is manufactured by the Heil Company under the designation Ardrier Model SD 75-22 which dryer is a multipass concurrent flow dryer wherein a high velocity airflow heated to approximately 2000° F. by a suitable combustion means such as a gas or oil fired heater for example, carries the comminuted green plant matter through the dryer in a fluidized manner whereby the desired amount of moisture is removed from the plant in a matter of seconds. In operation the typical discharge temperature of a dryer of the nature described would be approximately 400° F. In a typical operation the comminuted cane would be dried to a moisture content of about 1%-3%, for example.

It has been found that the comminuted relatively moist cane should not be permitted to remain in a transporting vehicle or in piles of any significant size for more than twelve hours prior to artificial drying so as to avoid any significant biochemical degradation of the cane such as through the agency of fermentation, for example, prior to artificial drying thereof. The dried racchariferous cane plant animal feed exiting from the dryer is collected in suitable cyclone separator devices or the like and may be utilized in that form or alternatively comminuted by passage through a suitable hammer mill, for example, to reduce the particle size to approximately that which all the particles will pass through a mesh screen having apertures of 1/8" or other suitable mesh depending upon the animals being fed, etc. The invention further contemplates that the dried particulate cane feed may be rehydrated up to a total moisture content of about 3%-8%, either with or without prior reduction in size by comminution, whereby partial rehydration facilitates forming pellets of the feedstuff in a suitable pelletizing apparatus. Furthermore, the partial rehydration, particularly when carried forth in conjunction with a pressure pelletizing operation forms a sacchariferous-proteinaceous glaze on the surface of the pellets thereby assuring that when the pellets are stored under conditions of reasonable temperature and humidity the feed pellets will not undergo any significant biochemical degradation and thus will retain their nutritive value over extended periods of time. As indicated heretofore it is not necessary in carrying forth the method of the present invention to partially rehydrate the dried cane feed exiting from the dryer and accordingly it will be understood that the dried cane may be packaged such as by bagging or baling for subsequent use without any further treatment thereof.

The partial rehydration of the dried feed is normally accomplished by injecting an appropriate amount of wet steam into the pelletizing apparatus. However, it will be understand that the water required could be obtained from a generally aqueous solution such as molasses or a crude sugar solution although it will be appreciated that from an economic standpoint this is not normally desirable.

From the foregoing it will be further appreciated that the protein, nitrogen-free extract (including sugar), fat, fiber, etc. content of feed produced in accordance with this invention may thus be regulated so as to produce feeds of varying analysis suitable for both the dairy and beef cattle, for example, as required by the particular feeding program being contemplated generally without the necessity of adding expensive additives, as normally required in conjunction with numerous other feeds.

The following examples are included to specifically illustrate the practice of the method of the present invention for the production of sacchariferous feed and it will be appreciated as indicated heretofore that when referring to Brix degrees in the examples this generally refers to the average sugar content of the portion of relatively sugar-rich stalk removed with the relatively sugar-free top portion of the cane plant. When determining the length of sugar cane stalk to be severed with the top to insure incorporation of an appropriate amount of sugar in the final product it is normally customary to make an approximation of the total weight of that portion of the cane plant removed by reference to appropriate U.S. Department of Agriculture standard tables relating the weight per foot of stalk length per acre to the diameter of sugar cane.

By way of illustration, 40 tons of sugar cane stalks having approximately 7 tons of immature upper ends or tops which tops did not contain a measurable amount of sugar, as determined by refraction analysis, averaged four to six tons of stalks per foot, wherein the stalk referred to is the entire jointed portion of the plant from the ground up to the immature upper end, which stalk can at times vary from approximately 3 to 15 feet in length. The stalk portion of the sugar cane plant contains a significant proportion of sugar and as determined by refraction may contain a sugar solution of from 1° to 25° Brix along various portions of the stalk. For example, the lower sugar concentration, i.e. 1° Brix would be present adjacent the upper immature end of the stalk and proceeding further down the stalk, one to three inches, for example, the Brix degree reading becomes relatively static, that is to say within a particular cane field of a given maturity or cane variety the stalk from that point downward to the ground would contain 15°-25° Brix, for example. Accordingly as indicated heretofore to make a low sugar content feed you would use the immature upper end, or top and only a short length of the upper portion of the relatively sugar-rich stalk. As an additional length of cane stalk is severed with the top the sugar content of the final feed will of course be increased.

The following table furnished by the USDA Sugar-cane Field Station, Houma, La., is exemplary of a table that may be selectively utilized to determine the weight of standing sugar cane. It will be appreciated, of course, that the standing weight of the cane to be cut could be determined empirically by severing several lengths of cane to arrive at an average weight per foot.

| Variety | Stalk | | | Number of eyes per stalk | Planting rate per acre [1] | |
|---|---|---|---|---|---|---|
| | Diameter (inches) | Length (inches) | Weight (pounds) | | Tons | Eyes |
| Co. 290 | 1.05 | 61.7 | 2.65 | 14.0 | 4.16 | 43,818 |
| C.P. 29/116 | 1.08 | 83.6 | 3.12 | 16.2 | 3.62 | 37,461 |
| C.P. 34/120 | 0.79 | 70.0 | 2.29 | 12.9 | 3.24 | 36,590 |
| C.P. 36/13 | 0.97 | 71.2 | 2.85 | 14.8 | 3.87 | 40,242 |
| C.P. 36/105 | 0.86 | 81.5 | 2.06 | 15.9 | 2.45 | 37,832 |
| C.P. 36/183 | 0.93 | 63.1 | 2.29 | 14.8 | 3.51 | 45,494 |
| C.P. 44/101 | 0.91 | 69.2 | 2.79 | 14.1 | 3.90 | 39,559 |
| C.P. 44/155 | 1.01 | 66.1 | 3.21 | 11.4 | 4.70 | 33,405 |
| C.P. 45/184 | 0.82 | 67.4 | 2.43 | 13.4 | 3.49 | 38,565 |
| C.P. 47/191 | 0.74 | 78.0 | 2.12 | 15.9 | 2.63 | 39,513 |
| C.P. 47/193 | 0.84 | 71.9 | 2.37 | 15.0 | 3.15 | 39,852 |
| C.P. 48/103 | 0.94 | 63.7 | 2.73 | 13.2 | 4.15 | 40,014 |
| C.P. 50/28 | 0.85 | 76.0 | 2.82 | 16.5 | 3.12 | 42,055 |
| N. Co. 310 | 0.98 | 72.0 | 2.71 | 14.5 | 3.64 | 39,097 |

[1] 2 running stalks plus 10% lap.

Harvesting weights are in ratio to planting weights, only you adjust tons by the number of stalks grown in the same length shown here for planting. If you have two stalks at planting, and i.e. 20 stalks at harvest, you will have ten times the tonnage shown on this chart.

EXAMPLE I

A pelletized feed characterized by a sugar content of approximately 13% was produced from 7 tons of immature cane tops, having no measurable amount of sugar as determined by refraction subsequent to controlled burning of the standing cane to burn off trash and reduce the moisture content about 6% while sealing in the nutrients, together with 6 tons of cane stalks, representing one foot of stalk left with the top, which cane stalk had an average sugar content expressed as 15° Brix as determined by refraction and accordingly containing approximately 1020 pounds of sugar. The 13 tons of cane having a moisture content of about 70% were harvested and simultaneously comminuted to a particle size of up to ¼" by utilization of a forage harvester. The comminuted cane was subsequently dried by means of a heated gaseous current in a multipass dehydrator having an inlet temperature of about 2000 F. wherein the cane was dried to a moisture content of approximately 1% to 3% so as to produce approximately 3.9 tons of relatively dry fluent sacchariferous feed having a sugar content of approximately 13%. The dry feed was further comminuted to a maximum particle size of approximately ¼" in a suitable hammer mill and rehydrated to as high as approximately 3%-8% moisture content with wet steam in a suitable pelletizing apparatus wherein is was agglomerated and extruded through a ¼" die to form pellets. The pellets which were characterized by a sacchariferous glaze were fed to beef cattle at the rate of 15 pounds per animal per day so as to afford approximately 1.95 pounds of sugar per animal day. The feed was characterized by a very natural green color and a desirable aroma as evidenced by the fact that in free feeding trials the animals found the sacchariferous feed produced in accordance with the method of the present invention to be more desirable than most other pelletized dry feeds.

EXAMPLE II

A meal type feed characterized by a sugar content of approximately 18% was produced from 7 tons of immature cane tops, having substantially no measurable amount of sugar as determined by refraction subsequent to controlled burning of the standing cane to burn off trash and reduce the moisture content about 6% while sealing in the nutrients. In order to incorporate an appropriate amount of sugar 13 tons of cane stalks, representing two feet of stalk left with the top, which cane stalk had an average sugar content expressed as 15° Brix as determined by refraction and accordingly containing approximately 2040 pounds of sugar. The 19 tons of cane having a moisture content of about 70% were harvested and windrowed in the field for a period of approximately three days so as to reduce the moisture content to approximately 60%. The partially dried cane was then loaded into a suitable self-unloading transporting device by utilization of a forage harvester which simultaneously comminuted the cane to a particle size of approximately ¼". The comminuted cane was subsequently dried, within 12 hours of the field chopping, by means of a heated gaseous current in a multipass dehydrator having an inlet temperature of about 2000° F. wherein the particulate cane was dried to a moisture content of approximately 1% to 3% so as to produce approximately 5.7 tons of relatively dry fluent sacchariferous feed having a sugar content of approximately 18%. A portion of the feed was baled and/or hermetically packaged in this form for subsequent use. Other portions of the relatively dry feed were further comminuted to a maximum particle size of approximately ⅛" in a suitable hammer mill and hermetically packaged as a meal. The feed so produced was fed to beef cattle at the rate of 15 pounds per animal per day so as to afford approximately 2.68 pounds of sugar per animal perday. The feed was characterized by a very natural green color and a desirable aroma as evidenced by the fact that in free feeding trails the animals found the sacchariferous feed produced in accordance with the method of the present invention to be more desirable than most other particulate dry feeds.

EXAMPLE III

A pelletized feed characterized by a sugar content of approximately 43% was produced from approximately 1 acre of sugar cane which had been treated by controlled burning to consume the trash comprising ground debris and dried leaves while simultaneously reducing the moisture content approximately 6% and sealing in the minerals and proteinaceous components present in the top portion of the cane plant. It was determined that the acre contained approximately 7 tons of immature cane tops having no measurable amount of sugar as determined by refraction. The remainder of the cane stalk comprised 40 tons of cane having an average sugar content expressed at 25° Brix as determined by refraction and accordingly containing approximately 12,160 pounds of sugar. The 47 tons of cane stalks and tops having a moisture content of about 70% were harvested and simultaneously comminuted to a particle size of up to ¼" by utilization of a forage harvester. The comminuted cane was subsequently suubstantially dried by means of a heated gaseous current in a multipass dehydrator having an inlet temperature of about 2000° F., and an outlet temperature of approximately 400° F. wherein the cane was dried to a moisture content of approximately 1% to 3% so as to produce approximately 14 tons of relatively dry fluent sacchariferous feed having a sugar content of approximately 43%. The dry feed was further comminuted to a maximum particle size of approximately ⅛" to ¼" in a suitable hammer mill and rehydrated to as high as approximately 5%-8% moisture content with wet steam in a suitable pelletizing apparatus wherein it was agglomerated and extruded through a ¼" die to form pellets. The feed was characterized by a very natural green color and a desirable aroma as evidenced by the fact that in free feeding trials the animals found the sacchariferous feed produced in accordance with the method of the present invention to be more desirable than most other pelletized dry feeds.

The foregoing is considered as illustrative only of the principles of the method of the invention. Further, since numerous modifications of the physical nature and composition of the feed produced will readily occur to those skilled in the art, it is not desired to limit the invention to the exact method or feed analysis described, and accordingly all suitable modifications and equivalents may be resorted to, falling within the scope of the invention as claimed.

What is claimed as new is as follows:

1. The method of producing a stable generally fluent sacchariferous animal feed chartcerized by a predetermined sugar content from sugar cane plant tops, stalks and the like which comprises:

heating by back-firing standing sugar cane in the field from the downwind side to provide a controlled burning prior to harvesting to a generally non-charring temperature to reduce both the moisture content of the cane about 6% and the proportion of nutritionally undesirable crude cellulosic fiber by the controlled burning thereof and effectively seal in nutritionally assimulatable constituents naturally present in the cane plant tops and stalks, said heating being accomplished by the controlled burning of the dead relatively dry cane plant leaves present both on the plant and the ground without charring the remaining portion of the cane plant;

determining by means of a quantittative analysis the amount of relatively sugar-rich cane plant stalk to be removed with the relatively sugar-free cane plant tops to provide the sugar necessary for the production of an animal feed having a predetermined sugar content;

cutting off the predetermined portion of the cane plant;

comminuting the portion removed to a particle size generally ingestible by an animal for whom the feed is intended; and subjecting the comminuted cane plant portions to a heated gaseous current to dry the comminuted cane to a moisture content of about 1%–3% to produce a generally fluent and non-biochemically degradable animal feed of a predetermined sugar content.

2. The method of claim 1 wherein the quantitative analysis comprises a determination of the average Brix degree of the sap present in the cane stalk with a refractometer.

3. The method of claim 1 wherein the cutting off of the predetermined portion and comminution thereof is accomplished with a forage harvester.

4. The method of producing a stable generally fluent sacchariferous animal feed characterized by a predetermined sugar content from sugar cane plant tops, stalks and the like which comprises:

heating by back-firing standing sugar cane in the field from the downwind side to provide a controlled burning prior to harvesting to a generally non-charring temperature to reduce both the moisture content of the cane about 6% and the proportion of nutritionally undesirable crude cellulosic fiber by controlled burning thereof and effectively seal in nutritionally assimilatable constituents naturally present in the cane plant tops and stalks, said heating being accomplished by controlled burning of the dead relatively dry cane plant leaves present both on the plant and the ground without charring the remaining portion of the cane plant;

determining by means of a quantitative analysis the amount of relatively sugar-rich cane plant stalk to be removed with the relatively sugar-free cane plant tops to provide the sugar necessary for the production of an animal feed having a predetermined sugar content;

cutting off the predetermined portion of the cane plant;

comminuting the portion removed to a particle size generally ingestible by an animal for whom the feed is intended;

subjected the comminuted cane plant portions to a heated gaseous current to dry the comminuted cane to a moisture content of about 1%–3% to produce a generally fluent and non-biochemically degradable animal feed of a predetermined sugar content;

partially rehydrating the dry comminuted cane to a moisture content of about 3%–8% to tackify the comminuted cane to facilitate pelletizing; and pelletizing the partially rehydrated comminuted cane to form feed pellets characterized by a sacchariferous glaze.

5. The method of producing a stable generally fluent sacchariferous animal feed having a nutritionally significant proportion of sugar from sugar can plant tops, stalks and the like which comprises:

heating by back-firing standing sugar cane plants in the field from the downwind side to provide a controlled burning thereof prior to harvesting with the controlled burning removing dry leaves on the lower portion of the cane plant and partially dehydrating the upper portions about 6% without charring the cane plant tops to reduce the proportion of nutritionally undesirable crude cellulosic fiber and effectively seal in the mineral and proteinaceous substances and the like in the cane stalks and tops, said controlled burning being accomplished by controlled burning of the relatively dry cane plant leaves present both on the plant and the ground without charring the remaining portion of the cane plant;

determining quantitatively the length of relatively sugar-rich cane plant stalk to be removed with the relatively sugar-free cane plane tops to provide the sugar necessary for the production of an animal feed having a predetermined sugar content;

having the cane plant top together with a length of the stalk as determined above;

naturally field drying the harvested portion of the cane plant to further reduce the moisture content without significantly altering the nutritional value thereof;

comminuting the partially dried cane tops and stalks so as to facilitate drying the cane in an artificially heated gaseous flow; and subjecting the comminuted cane plant to a heated gaseous current to dry the comminuted cane to a moisture content of about 1 to 3%.

6. The method of claim 5 wherein the quantitative analysis comprises a determination of the average Brix degree of the sap present in the cane stalk with a refractometer.

7. The method of claim 5 wherein the cutting off of the predetermined portion and comminution thereof is accomplished with a forage harvester.

8. The method of producing a stable generally fluent pelletized sacchariferous animal feed having a nutritionally significant proportion of sugar from sugar cane plant tops, stalks and the like which comprises:

heating by back-firing standing sugar cane plants in the field from the downwind side to provide a controlled burning thereof prior to harvesting with the controlled burning removing dry leaves on the lower portion of the cane plant and partially dehydrating the upper portions of the cane plant about 6% without charring the cane plant tops to also reduce the proportion of nutritionally undesirable crude cellulosic fiber and effectively seal in the mineral and proteinaceous substances and the like present in the cane stalks and tops, said controlled burning being accomplished by controlled burning of the relatively dry cane plant leaves present both on the plant and the ground;

determining quantitatively the length of relatively sugar-rich cane plant stalk to be removed with the relatively sugar-free cane plant tops to provide the sugar necessary for the production of an animal feed harving a predetermined sugar content;

harvesting the cane plant top together with a length of the stalk as determined above;

naturally field drying the harvested portion of the cane plant to further reduce the moisture content without significantly altering the nutritional value thereof;

comminuting the partially dried cane tops and stalks so as to facilitate drying the cane in an artificially heated gaseous flow;

subjecting the comminuted cane plant to a heated gaseous current to dry the comminuted cane to a moisture content about 1 to 3%;

partially rehydrating the dried comminuted cane to a moisture content of about 3%–8% to facilitate pelletizing; and pelletizing the partially rehydrated comminuted cane to form feed pellets characterized by a sacchariferous glaze.

References Cited

FOREIGN PATENTS 1,981    8/1858   Great Britain _____ 99—2

OTHER REFERENCES

Balch et al., "Effect of Burning on the Deterioration of Sugarcane Under Louisana Conditions," U.S.D.A., Technical Bul. No. 1021, November 1950.

LIONEL M. SHAPIRO, Primary Examiner